United States Patent [19]

Johnston

[11] 3,741,210
[45] June 26, 1973

[54] SURGICAL PADS
[75] Inventor: John Johnston, Michigan City, Ind.
[73] Assignee: Scholl, Inc., Chicago, Ill.
[22] Filed: Sept. 22, 1971
[21] Appl. No.: 182,746

Related U.S. Application Data
[62] Division of Ser. No. 865,604, Oct. 3, 1969, abandoned.

[52] U.S. Cl. ................. 128/153, 128/156, 264/321
[51] Int. Cl. ............................................. A61f 5/30
[58] Field of Search .................. 128/153, 155, 156, 128/157, 595; 264/321, DIG. 46

[56] References Cited
UNITED STATES PATENTS

| 3,268,912 | 8/1966 | Whelan | 128/153 X |
| 3,132,648 | 5/1964 | Scholl | 128/153 |
| 3,301,254 | 1/1967 | Schickendanz | 128/153 |
| 2,585,629 | 2/1952 | Crawford | 128/153 |
| 3,062,208 | 11/1962 | Scholl | 128/153 |
| 2,081,716 | 5/1937 | Scholl | 128/153 |
| 2,098,312 | 11/1937 | Scholl | 128/153 |
| 3,086,523 | 4/1963 | Lowth | 128/153 |
| 2,914,109 | 11/1959 | Hsu et al. | 264/DIG. 46 |
| 3,370,117 | 2/1968 | Blue | 264/321 |
| 3,378,432 | 4/1968 | Spencer | 264/321 X |
| 3,544,675 | 12/1970 | Belle Isle | 264/321 |

FOREIGN PATENTS OR APPLICATIONS 835,303  5/1960  Great Britain ..................... 128/153

Primary Examiner—Richard A. Gaudet
Assistant Examiner—J. Yasko
Attorney—Carlton Hill, J. Arthur Gross, M. R. Chambers et al.

[57] ABSTRACT

Surgical pads for relieving the pain of corns, callouses, bunions, abrasions, etc., which pads are made of thermoplastic chemical foam and each having an affliction-receiving cavity pressed into the body of the pad from the underface of the pad.

4 Claims, 8 Drawing Figures

PATENTED JUN 26 1973 3,741,210
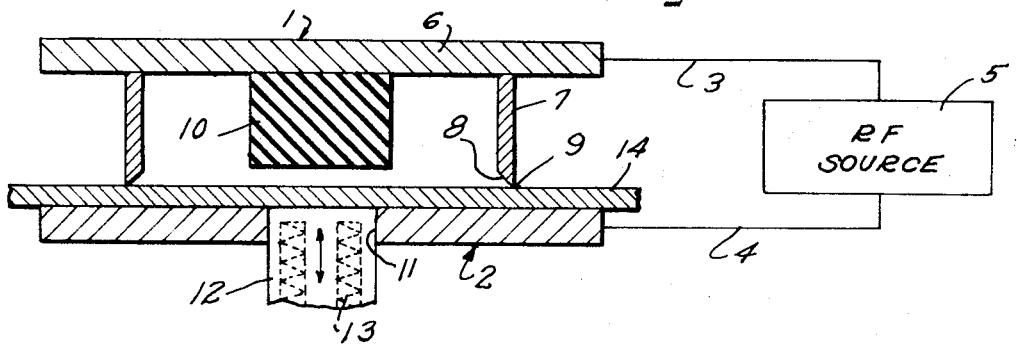
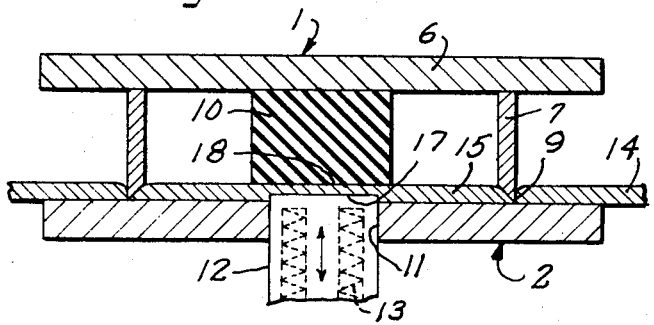
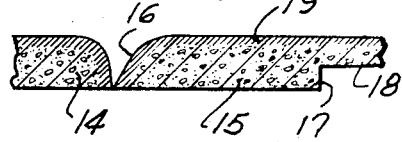
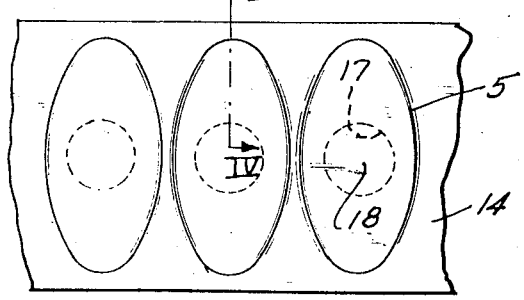
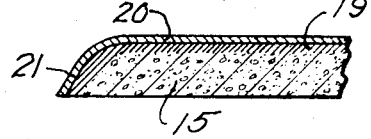
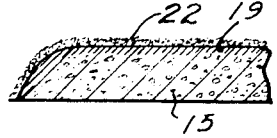
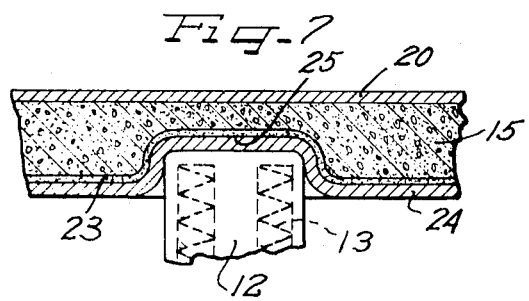
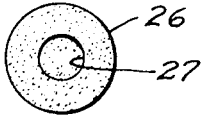
INVENTOR
John Johnston
BY Hill, Sherman, Meroni, Gross & Simpson ATTORNEYS

SURGICAL PADS

CROSS-REFERENCE TO RELATED APPLICATION

The instant application is a division of my copending application filed Oct. 13, 1969, Ser. No. 865,604, now abandoned under the title "Surgical Pads and Method of Making the Same," and now entitled "Method of Making Surgical Pads."

SUMMARY OF THE INVENTION

In the past, in the manufacture of surgical pads have an opening or cavity therein to receive an affliction or medicament, or both, and eliminate pressure upon the affliction, it was common practice to die-cut a hole in the body of the pad when the pad was cut from a sheet of stock of indefinite size. Difficulty was experienced in getting rid of the small piece of waste where the hole was cut. Where a cover was desired over the affliction-receiving cavity it was necessary to laminate an extra piece of material to the pad body on the face thereof opposite the one carrying the adhesive, and in many cases such a cover is found desirable, especially where the affliction may be open or a certain type of medicament is indicated for that affliction. Manufacture of the covered pads was consequently objectionably expensive.

While this application claims the invention as a product or article of manufacture, in order to better describe the specifics of the invention, reference will be herein made to the method of making the pads, which method is claimed in my aforesaid parent application.

The present invention overcomes the difficulties mentioned above as occurring in the past, and materially reduces the cost of making pads with a covered depression or cavity for receiving an affliction. The pads of the instant invention are each made from a single unitary piece of material. This is accomplished by the use of hot die means and cutting the pad from a stock sheet of synthetic resin or chemical foam material which can be purchased in sheet form with a smooth skin-like surface necessitating no cover thereover. Contemporaneously with the cutting of the pad, a hot probe contacts the adhesived face of the pad being formed and presses a depression or cavity in the body of the pad by collapsing the cells of the foam and establishing a denser material over the probe. As a result, there is an affliction-receiving cavity that has a cover thereover. The pad may be formed in one operation from a stock strip of adhesive-bearing foam and no material is removed from the pad body proper, eliminating the need of disposing of small bits of waste where holes were previously cut and eliminating the operation of laminating a cover over one surface of the pad body having a hole therethrough. The result is a pad of high and durable quality, having an excellent cushioning effect and which may be manufactured more economically than heretofore.

Other objects, features and advantages of the present invention will be readily apparent from the following detailed description of several embodiments thereof when taken in conjunction with the accompanying drawings.

BRIEF DESCRIPTION OF THE DRAWINGS

FIG. 1 is a fragmentary vertical sectional view of die means used and illustrating an initial step in the operation of making the pad;

FIG. 2 is a view similar in character to FIG. 1 but showing the pad in its formed state;

FIG. 3 is a fragmentary plan view of pads shaped and cut but prior to the removal of waste stock;

FIG. 4 is an enlarged fragmentary vertical sectional view taken substantially as indicated by the line IV—IV of FIG. 3;

FIG. 5 is a fragmentary vertical sectional view of a pad of slightly different construction;

FIG. 6 is a fragmentary vertical sectional view through a pad having flocking on the top thereof;

FIG. 7 is a fragmentary view illustrating that the probe may be used through a sheet carrying a release facing; and FIG. 8 is a bottom plan view of a pad of different shape to illustrate that the shapes of the pads may be varied in accord with their specific purposes.

DESCRIPTION OF THE PREFERRED EMBODIMENTS

The pads of the instant invention may be of any desired size and shape depending upon the particular use for which an individual pad is intended. The pads are preferably cut from the stock sheet by die means usable in a known form of electronic heat-sealing press. Such die means are best seen in FIGS. 1 and 2. There is an upper die, generally indicated by numeral 1 and a lower die generally indicated by numeral 2. Both dies are electrically conductive and may be connected by conductors 3 and 4, respectively, to a source 5 of ultra high or radio frequency current, diagrammatically shown.

The upper die comprises a conductive backing 6 from which a conductive skirt 7 depends, the skirt being shaped in accordance with the bounding outline of a pad to be formed. The skirt is beveled as at 8, on the inner side thereof, terminating in a knife edge 9. Inside the skirt in a location where an affliction-receiving cavity may be desired, a plug 10 of insulating material depends from the back member 6 to act as a backup for a probe to be later described.

The lower die 2 may be in the form of a flat plate having an aperture 11 therein through which a probe 12 is reciprocated by any suitable means. This probe, inside thereof, carries one or more electrical heating units 13 of a known variety. The material from which the pads are made is preferably a high density plastic foam, such a plasticized polyvinyl chloride, polyurethane, polyurethane impregnated with polyvinyl chloride, of which the density is usually 10 to 15 pounds per cubic foot, depending on the desired cushioning effect. Other thermoplastic foams that may be utilized include polyethylene, polypropylene, or Surlyn-A Ionomer, among others. The foam thickness can vary, dependent upon the end usage, and usually foam the thickness of one-sixteenth inch to one-eighth inch is satisfactory for most purposes. Such foam can be obtained in sheet form having an integral natural smooth finished skin on one side thereof, whereby nothing else is needed as a cover for the foam, unless some specific type of cover or appearance is desired. Either open celled or closed celled foam may be utilized, since the result will be the same in either instance.

The forming of a pad is a simple and rapid operation. A stock sheet or strip 14 of indefinite size is placed over the lower die 2, the strip preferably carrying a pressure sensitive adhesive spread on its under face. The upper die 1 is then lowered under pressure from the position of FIG. 1 to the position of FIG. 2 thus shaping and substantially severing a pad 15 from the stock strip. The inner bevel on the skirt 7 of the upper die shapes the bounding edge of the resultant pad and when the dies are charged with radio or high frequency current, a nice rounded shape as indicated at 16 in FIG. 4 is permanently formed in the pad as a result of the heat-sealing operation. Contemporaneously with the lowering of the upper die 1, the probe 12 is forcefully elevated from the position seen in FIG. 1 to that of FIG. 2, the block 10 of insulating material carried by the upper die acting as a backup for the probe so there is no deformation in the upper face of the pad, and the squeezing action between the probe and the backup collapses the cells in the foam above the probe and provides an affliction-receiving cavity 17. The probe is heated to the softening temperature of the particular foam being utilized, in the general range of 20° to 40° below the melting point of the foam. The heat and pressure of the probe destroys the cells in the foam in the region 18 above the probe, adding to the density of the foam in this region and permanently establishing the cavity 17 covered by the denser material 18. Thus, the need for removal of any waste material resulting from the cutting of an aperture through the body of the pad is eliminated.

Whether or not the adhesive contacted by the probe is destroyed is selective. For example, the probe will not destroy an acrylic or other high temperature resisting adhesive which remains stable to a higher temperature than that of the probe. Medicament may then be placed in the cavity and held there by way of the adhesive surface on the underside of the covering portion 18. On the other hand, if it is intended that the pad be placed over an open affliction such as a cut or a wound, an adhesive may be utilized that will be destroyed by the heat of the probe and then there will be no adhesive contacting the particular affliction.

The pad is accordingly extremely economical to manufacture, the upper die being forced down, the probe forced up, the electrode dies are charged with high frequency current, and the pad is complete within a very few seconds. The waste stock is easily stripped from the completed pad by virtue of the action of the knife edge 9 on the upper die and the charge of current passing therethrough.

In the example of FIG. 4, a pad 15 is formed solely from the foam itself, the foam being of the type having a smooth external skin, diagrammatically indicated at 19 which necessitates no other covering, that skin being sufficiently smooth to permit the rapid donning of articles of apparel without any snagging of the pad.

Should it be desired for decorative purposes or any other reason, a colored thin sheet or film, such as a vinyl film 20, may be placed over the foam as seen in FIG. 5. The foam may be obtained with the sheet 20 already laminated thereto, or such a sheet or film may be laid over the stock strip 14 and when the pad is formed the cover 20 will be heat sealed to the foam in the marginal region 21.

Heretofore, pads of this general type have been most frequently made with a top layer of napped or pile fabric, such as moleskin. The same effect can be obtained, if desired, in the instant pads by merely utilizing a foam having a flocking on its upper face, as shown at 22 in FIG. 6. The flocking may be cotton, rayon, nylon, or equivalent fibers, and the resultant pile size can be of selective heights, usually from one to three millimeters being satisfactory. The formation of a pad in the manner above described does not change the contour of the pad, a flocked pad having the same smooth curvature around the bounding edge.

It is usually desirable to cover the entire adhesive spread on the stock strip with a sheet of material having a release facing as customarily used to protect an adhesive face until the pad is put to use. In FIG. 7, I have made an exaggerated showing of a pad with the adhesive spread indicated at 23, and a protective sheet 24 disposed over that adhesive face, the protective sheet being of paper having a release coating thereon or any other suitable material. As long as the protective sheet 24 is capable of withstanding the temperature of the probe 12, the probe may be applied directly to the protective sheet and an affliction-receiving cavity 25 will be formed in the resultant pad in the same manner as above described.

In FIG. 8 I have shown the underface of a round pad 26 having an affliction-receiving opening 27 therein made in the same manner as pad 15 above described, this showing being merely to illustrate possible variations in pad shape.

Although various minor modifications might be suggested by those versed in the art, it should be understood that I wish to embody within the scope of the patent granted hereon all such modifications as reasonably and properly come within the scope of my contribution to the art.

I claim as my invention:

1. In a cushion type surgical pad for relieving an affliction from pressure,
    a unitary body of thermoplastic cellular foam,
    said body having an affliction receiving cavity opening from the underface thereof,
    a compressed portion of said body in which the cells of the foam are destroyed covering and maintaining the permanence of said cavity, and
    means to attach the pad directly to the body of a user.

2. The surgical pad of claim 1, wherein said body part is one-piece and has a smooth integral surface forming the upper face of the pad.

3. The surgical pad of claim 1, wherein said means to attach the pad comprise a pressure sensitive adhesive spread on the underface of said body part and lining said cavity.

4. The surgical pad of claim 3, including a protective release sheet covering the exposed face of said adhesive spread and extends into said cavity along with the adhesive in said cavity.

* * * * *